(12) United States Patent
Li

(10) Patent No.: US 11,068,687 B1
(45) Date of Patent: Jul. 20, 2021

(54) OLED DISPLAY PANEL AND OLED DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Jun Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 496 days.

(21) Appl. No.: 16/302,156

(22) PCT Filed: Aug. 2, 2018

(86) PCT No.: PCT/CN2018/098273
§ 371 (c)(1),
(2) Date: Nov. 16, 2018

(87) PCT Pub. No.: WO2019/218493
PCT Pub. Date: Nov. 21, 2019

(30) Foreign Application Priority Data

May 18, 2018 (CN) .......................... 201810476931.7

(51) Int. Cl.
*G06K 9/00* (2006.01)
*G09G 3/3233* (2016.01)
(Continued)

(52) U.S. Cl.
CPC ......... *G06K 9/0002* (2013.01); *G09G 3/3233* (2013.01); *G09G 2300/0439* (2013.01);
(Continued)

(58) Field of Classification Search
CPC .. G06K 9/0002; G09G 3/3233; G09G 3/3644; G09G 2300/0439;
(Continued)

(56) References Cited

U.S. PATENT DOCUMENTS

2017/0031485 A1* 2/2017 Kim ..................... G09G 3/3233
2017/0123566 A1* 5/2017 Noguchi ............... G06F 3/0445
(Continued)

FOREIGN PATENT DOCUMENTS

| CN | 106056099 A | 10/2016 |
|---|---|---|
| CN | 106229331 A | 12/2016 |
| CN | 107025451 A | 8/2017 |

*Primary Examiner* — Mihir K Rayan

(57) ABSTRACT

An organic light-emitting diode (OLED) display panel is provided. The OLED display panel includes a light-emitting layer having a first region and a second region; a common electrode layer including a first electrode and a plurality of multiplexed electrodes insulated from one another, wherein the first electrode is opposite to the first region and each multiplexed electrode is opposite to the second region; and a multiplexed functional line, wherein the multiplexed functional line is electrically connected to one of the plurality of multiplexed electrodes, to detect a capacitance change caused by the one of the plurality of multiplexed electrodes and a finger, and thereby generate a fingerprint signal. An increased screen ratio effect is provided.

20 Claims, 2 Drawing Sheets

FIG. 2

(52) U.S. Cl.
CPC ............... *G09G 2300/0819* (2013.01); *G09G 2300/0842* (2013.01)

(58) Field of Classification Search
CPC ... G09G 2300/0819; G09G 2300/0842; G09G 2320/02; G06F 2203/0338
See application file for complete search history.

(56) References Cited

U.S. PATENT DOCUMENTS

| | | |
|---|---|---|
| 2017/0372113 A1 | 12/2017 | Zhang et al. |
| 2018/0060641 A1 | 3/2018 | Kim et al. |
| 2018/0239942 A1 | 8/2018 | Xu et al. |
| 2018/0373915 A1 | 12/2018 | Ling et al. |

\* cited by examiner

OLED DISPLAY PANEL AND OLED DISPLAY DEVICE

FIELD OF INVENTION

The present disclosure relates to a field of liquid crystal display technology, and more particularly to an organic light-emitting diode (OLED) display panel and an OLED display device.

BACKGROUND OF INVENTION

Full-screens may greatly enhance screen ratios of cell phones, and are one developmental direction of display screens of cell phones. Integrating fingerprint recognition technologies into cell phone screens can change fingerprint recognition regions that do not emit light into display regions, increasing screen ratios of cell phones. Currently, it is difficult to integrate fingerprint recognition technologies into display screens. There may be differences between image qualities of fingerprint recognition regions and normal display regions in screens. Compensation for pixel display in fingerprint recognition regions is needed, to prevent fingerprint recognition region display from being abnormal. The present disclosure provides an on-screen fingerprint recognition solution. The solution may integrate a fingerprint recognition region into an active-matrix organic light-emitting diode (AMOLED) display panel, increasing screen ratios of AMOLED display panels.

Because a surface of AMOLED is a layer of a metal electrode that would shield a display screen from surface fingerprint information, the display screen cannot receive the fingerprint information, and thus fingerprint recognition cannot be completed.

Therefore, there exist deficiencies for existing technologies, and urgent improvements are needed.

SUMMARY OF INVENTION

An object of the present disclosure is to provide an organic light-emitting diode (OLED) display panel and an OLED display device, to have an increased screen ratio effect.

An embodiment of the present disclosure provides an OLED display panel. The OLED display panel includes:

a light-emitting layer having a first region and a second region;

a common electrode layer disposed over the light-emitting layer, wherein the common electrode layer includes a first electrode and a plurality of multiplexed electrodes electrically insulated from one another; the first electrode is opposite to the first region, to serve as a common electrode of the first region; and each multiplexed electrode is opposite to the second region, to serve as a fingerprint signal acquisition electrode and a common electrode of the second region;

a multiplexed functional line disposed over the light-emitting layer, wherein the multiplexed functional line is electrically connected to one of the plurality of multiplexed electrodes, to detect a capacitance change caused by the one of the plurality of multiplexed electrodes and a finger, and thereby generate a fingerprint signal; the multiplexed functional line is electrically connected to the light-emitting layer and an external compensating circuit, to compensate a gray scale current of the light-emitting layer; and a fingerprint recognition chip electrically connected to the multiplexed functional line.

In an OLED display panel embodiment of the present disclosure, the OLED display panel further includes: a first switch unit, a second switch unit, and a third switch unit, wherein an input terminal of the first switch unit receives a voltage signal; an output terminal of the first switch unit, the light-emitting layer, and an input terminal of the second switch unit are electrically connected together and are electrically connected to the one of the plurality of multiplexed electrodes; an output terminal of the second switch unit is electrically connected to the multiplexed functional line; and the multiplexed functional line is electrically connected to the light-emitting layer through the third switch unit.

In an OLED display panel embodiment of the present disclosure, the OLED display panel is configured such that operations of the OLED display panel include:

an external compensation stage during which the second switch unit is turned off, the third switch unit is turned on, and a compensation current is input to the light-emitting layer through the multiplexed functional line;

a fingerprint recognition stage during which the first switch unit is turned off, the second switch unit is turned on, and the third switch unit is turned off; and a light emission stage during which the first switch unit is turned on, the second switch unit is turned off, and the third switch unit is turned off.

In an OLED display panel embodiment of the present disclosure, the light-emitting layer comprises a plurality of light-emitting units; one of the plurality of light-emitting units comprises: a first thin film transistor, a second thin film transistor, a third thin film transistor, a storage capacitor, and an OLED light-emitting diode; an input terminal of the second thin film transistor is electrically connected to a data line; an output terminal of the second thin film transistor, a terminal of the storage capacitor, and a gate of the third thin film transistor are electrically connected together; the other terminal of the storage capacitor and an input terminal of the third thin film transistor are electrically connected together and receive a voltage VDD; an output terminal of the third thin film transistor, an input terminal of the first thin film transistor, and an output terminal of the third switch unit are electrically connected together; an input terminal of the third switch unit is electrically connected to the multiplexed functional line; an output terminal of the first thin film transistor is electrically connected to a terminal of the OLED light-emitting diode; the other terminal of the OLED light-emitting diode, the output terminal of the first switch unit, and the input terminal of the second switch unit are electrically connected together, and are electrically connected to the one of the plurality of multiplexed electrodes.

In an OLED display panel embodiment of the present disclosure, the first thin film transistor, the second thin film transistor, and the third thin film transistor are p-type field effect transistors.

In an OLED display panel embodiment of the present disclosure, the first switch unit, the second switch unit, and the third switch unit are p-type field effect transistors.

In an OLED display panel embodiment of the present disclosure, the OLED display panel further includes a gray scale current compensation chip electrically connected to the multiplexed functional line.

An embodiment of the present disclosure also provides an OLED display panel. The OLED display panel includes:

a light-emitting layer having a first region and a second region;

a common electrode layer disposed over the light-emitting layer, wherein the common electrode layer includes a first electrode and a plurality of multiplexed electrodes electrically insulated from one another; the first electrode is opposite to the first region, to serve as a common electrode of the first region; and each multiplexed electrode is opposite to the second region, to serve as a fingerprint signal acquisition electrode and a common electrode of the second region; and a multiplexed functional line disposed over the light-emitting layer, wherein the multiplexed functional line is electrically connected to one of the plurality of multiplexed electrodes, to detect a capacitance change caused by the one of the plurality of multiplexed electrodes and a finger, and thereby generate a fingerprint signal.

In an OLED display panel embodiment of the present disclosure, the multiplexed functional line is electrically connected to the light-emitting layer and an external compensating circuit, to compensate a gray scale current of the light-emitting layer.

In an OLED display panel embodiment of the present disclosure, the OLED display panel further includes: a first switch unit, a second switch unit, and a third switch unit, wherein an input terminal of the first switch unit receives a voltage signal; an output terminal of the first switch unit, the light-emitting layer, and an input terminal of the second switch unit are electrically connected together and are electrically connected to the one of the plurality of multiplexed electrodes; an output terminal of the second switch unit is electrically connected to the multiplexed functional line; and the multiplexed functional line is electrically connected to the light-emitting layer through the third switch unit.

In an OLED display panel embodiment of the present disclosure, the OLED display panel is configured such that operations of the OLED display panel include:

an external compensation stage during which the second switch unit is turned off, the third switch unit is turned on, and a compensation current is input to the light-emitting layer through the multiplexed functional line;

a fingerprint recognition stage during which the first switch unit is turned off, the second switch unit is turned on, and the third switch unit is turned off; and a light emission stage during which the first switch unit is turned on, the second switch unit is turned off, and the third switch unit is turned off.

In an OLED display panel embodiment of the present disclosure, the light-emitting layer comprises a plurality of light-emitting units; one of the plurality of light-emitting units comprises: a first thin film transistor, a second thin film transistor, a third thin film transistor, a storage capacitor, and an OLED light-emitting diode; an input terminal of the second thin film transistor is electrically connected to a data line; an output terminal of the second thin film transistor, a terminal of the storage capacitor, and a gate of the third thin film transistor are electrically connected together; the other terminal of the storage capacitor and an input terminal of the third thin film transistor are electrically connected together and receive a voltage VDD; an output terminal of the third thin film transistor, an input terminal of the first thin film transistor, and an output terminal of the third switch unit are electrically connected together; an input terminal of the third switch unit is electrically connected to the multiplexed functional line; an output terminal of the first thin film transistor is electrically connected to a terminal of the OLED light-emitting diode; the other terminal of the OLED light-emitting diode, the output terminal of the first switch unit, and the input terminal of the second switch unit are electrically connected together, and are electrically connected to the one of the plurality of multiplexed electrodes.

In an OLED display panel embodiment of the present disclosure, the first thin film transistor, the second thin film transistor, and the third thin film transistor are p-type field effect transistors.

In an OLED display panel embodiment of the present disclosure, the first switch unit, the second switch unit, and the third switch unit are p-type field effect transistors.

In an OLED display panel embodiment of the present disclosure, the OLED display panel further includes a fingerprint recognition chip electrically connected to the multiplexed functional line.

In an OLED display panel embodiment of the present disclosure, the OLED display panel further includes a gray scale current compensation chip electrically connected to the plurality of multiplexed functional lines.

An OLED display device includes an OLED display panel. The OLED display panel includes:

a light-emitting layer having a first region and a second region;

a common electrode layer disposed over the light-emitting layer, wherein the common electrode layer includes a first electrode and a plurality of multiplexed electrodes electrically insulated from one another; the first electrode is opposite to the first region, to serve as a common electrode of the first region; and each multiplexed electrode is opposite to the second region, to serve as a fingerprint signal acquisition electrode and a common electrode of the second region;

a multiplexed functional line disposed over the light-emitting layer, wherein the multiplexed functional line is electrically connected to one of the plurality of multiplexed electrodes, to detect a capacitance change caused by the one of the plurality of multiplexed electrodes and a finger, and thereby generate a fingerprint signal.

In an OLED display device embodiment of the present disclosure, the multiplexed functional line is electrically connected to the light-emitting layer and an external compensating circuit, to compensate a gray scale current of the light-emitting layer.

In an OLED display device embodiment of the present disclosure, the OLED display panel further includes: a first switch unit, a second switch unit, and a third switch unit, wherein an input terminal of the first switch unit receives a voltage signal; an output terminal of the first switch unit, the light-emitting layer, and an input terminal of the second switch unit are electrically connected together and are electrically connected to one of the plurality of multiplexed electrodes; an output terminal of the second switch unit is electrically connected to the multiplexed functional line; and the multiplexed functional line is electrically connected to the light-emitting layer through the third switch unit.

In an OLED display device embodiment of the present disclosure, the OLED display panel is configured such that operations of the OLED display panel include:

an external compensation stage during which the second switch unit is turned off, the third switch unit is turned on, and a compensation current is input to the light-emitting layer through the multiplexed functional line;

a fingerprint recognition stage during which the first switch unit is turned off, the second switch unit is turned on, and the third switch unit is turned off; and a light emission stage during which the first switch unit is turned on, the second switch unit is turned off, and the third switch unit is turned off.

Based on the foregoing, in the present disclosure, the common electrode layer is divided into the first electrode and the plurality of multiplexed electrodes electrically insulated from one another. The first electrode is opposite to the first region, to serve as the common electrode of the first region. Each multiplexed electrode is opposite to the second region, to serve as the fingerprint signal acquisition electrode and the common electrode of the second region. The multiplexed functional line is disposed over the light-emitting layer. The multiplexed functional line is electrically connected to one of the plurality of multiplexed electrodes, to detect a capacitance change caused by the one of the plurality of multiplexed electrodes and a finger, and thereby generate a fingerprint signal. Therefore, fingerprints may be acquired and normal display may be realized in the second region, thereby providing an increased screen ratio effect.

DESCRIPTION OF DRAWINGS

In order to describe a technical solution in embodiments or existing technology more clearly, drawings required to be used by the embodiments or the existing technology are briefly introduced below. Obviously, the drawings in the description below are only some embodiments of the present disclosure. With respect to persons of ordinary skill in the art, under a premise that inventive efforts are not made, other drawings may be obtained based on these drawings.

DETAILED DESCRIPTION OF PREFERRED EMBODIMENTS

Figure 1:
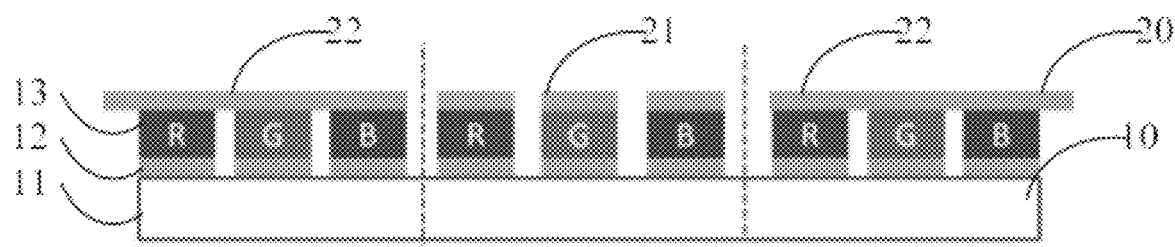
FIG. 1 is a schematic structural diagram of an organic light-emitting diode (OLED) display panel in accordance with an embodiment of the present disclosure.

Embodiments of the present disclosure are described in detail below and examples of the embodiments are illustrated in the accompanying drawings, wherein same or similar labels throughout the present disclosure represent corresponding same or similar elements or corresponding elements having same or similar functions. The description of the embodiments with reference to the accompanying drawings below is exemplary, aims at illustrating the present disclosure, and cannot be considered as limitations to the present disclosure.

In the description of the present disclosure, it is to be appreciated that orientation or location relationships indicated by terms such as "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are based on orientation or location relationships illustrated in the accompanying drawings. The terms are only used to facilitate the description of the present disclosure and to simplify the description, not used to indicate or imply the relevant device or element must have a particular orientation or must be structured and operate under the particular orientation and therefore cannot be considered as limitations to the present disclosure. In addition, the terms "first" and "second" are only used for description purpose, and cannot be considered as indicating or implying relative importance or implicitly pointing out the number of relevant technical features. Thus, features being correspondingly defined as "first" and "second" may each expressly or implicitly include at least one of the features. In the description of the present disclosure, the meaning of "a plurality of" is at least two, such as two and three, unless otherwise definitely and specifically defined.

In the description of the present disclosure, it is to be noted that unless otherwise definitely specified and defined, the terms "install", "connected", "connection", etc. should be considered broadly, for example, as a fixed connection, a detachable connection, an integral connection, a mechanical connection, an electrical connection, or a connection for communicating with each other; as being directly connected, or being indirectly connected through an intervening medium; as an internal connection between two elements, or as an operational relationship between two elements. To those of ordinary skill in the art, the specific meanings of the aforementioned terms in the present disclosure may be appreciated based on corresponding specific situations.

In the present disclosure, unless otherwise definitely specified and defined, when a first feature is "over" or "under" a second feature, the first feature may be directly in contact with the second feature, or the first feature and the second feature may not be directly in contact with each other and may be in contact through another feature between the first feature and the second feature. Furthermore, when the first feature is "over", "above", or "upper than" the second feature, the first feature may be directly above or obliquely above the second feature, or the phrase may merely mean that a level of the first feature is higher than a level of the second feature. When the first feature is "under", "below", or "lower than" the second feature, the first feature may be directly below or obliquely below the second feature, or the phrase may merely mean that a level of the first feature is lower than a level of the second feature.

The publication of the following description provides many different embodiments or examples for implementing different structures of the present disclosure. In order to simplify the publication of the present disclosure, in the following description, components and configurations of particular examples are described. Of course, they are only examples, and do not aim at limiting the present disclosure. In addition, the present disclosure may repeat reference numerals and/or reference letters in different examples. The repetition is for the purposes of simplicity and clarity, and the repetition itself does not indicate relationships between methods and/or configurations of various embodiments. Furthermore, the present disclosure provides various particular process and material examples, but those of ordinary skill in the art may think of application of other processes and/or use of other material.

Figure 2:
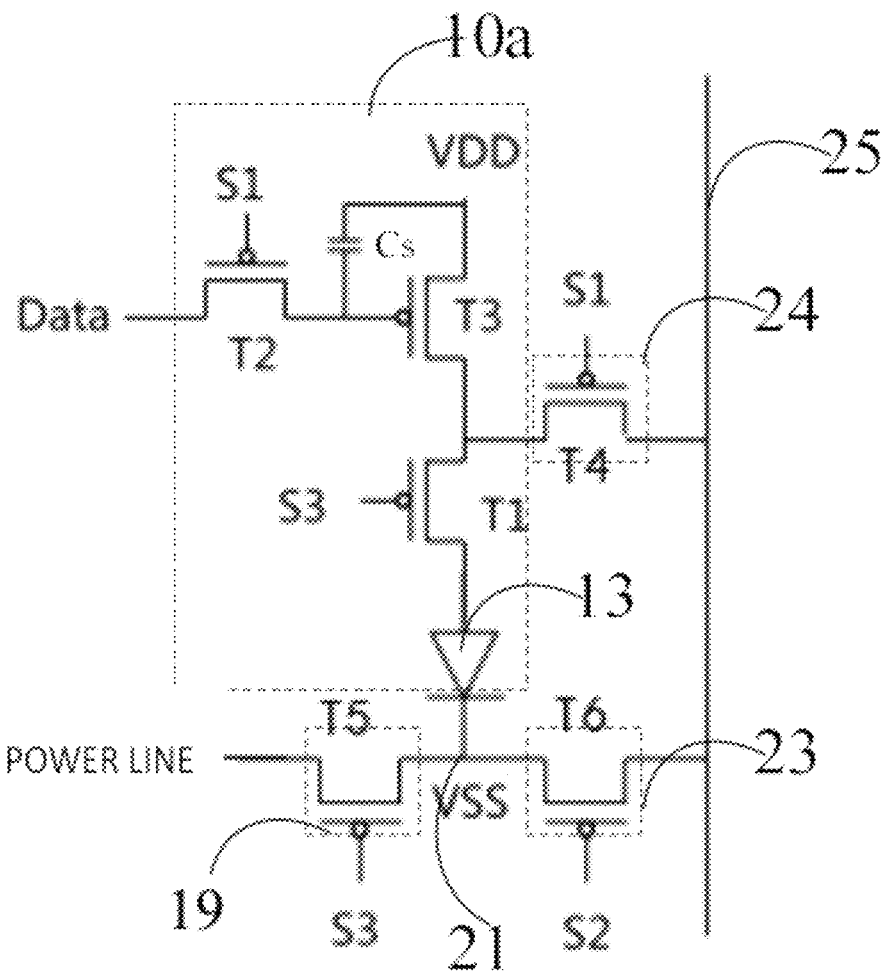
FIG. 2 is a schematic circuit diagram of a partial circuit of an OLED display panel in accordance with an embodiment of the present disclosure.

FIG. 1 is a schematic structural diagram of an organic light-emitting diode (OLED) display panel in accordance with an embodiment of the present disclosure. FIG. 2 is a schematic circuit diagram of a partial circuit of an OLED display panel in accordance with an embodiment of the present disclosure. Referring to FIGS. 1 and 2, the OLED display panel includes a light-emitting layer 10 and a common electrode layer 20 and a multiplexed functional line 25 disposed over the light-emitting layer 10.

The light-emitting layer 10 includes a substrate 11, a plurality of pixel electrodes 12 located over the substrate 11, and a plurality of light-emitting units 10a. The light-emitting layer 10 has a first region and a second region.

The common electrode layer 20 includes a first electrode 22 and a plurality of multiplexed electrodes 21 electrically insulated from one another. The first electrode 22 is opposite to the first region, to serve as a common electrode of the first region. Each multiplexed electrode 21 is opposite to the second region, to serve as a fingerprint signal acquisition electrode and a common electrode of the second region. The first electrode 22 is located in a normal display region. The plurality of multiplexed electrodes 21 are uniformly arranged in an array, and are located in a region for a composite of fingerprint recognition and display.

The multiplexed functional line 25 is disposed over the light-emitting layer 10. The multiplexed functional line 25 is electrically connected to one of the plurality of multiplexed electrodes 21, to detect a capacitance change caused by the one of the plurality of multiplexed electrodes 21 and a finger, and thereby generate a fingerprint signal.

In an embodiment, the multiplexed functional line 25 is electrically connected to the light-emitting layer 10 and an external compensating circuit, to compensate a gray scale current of the light-emitting layer 10.

In an embodiment, the OLED display panel further includes a first switch unit 19, a second switch unit 23, and a third switch unit 24. An input terminal of the first switch unit 19 receives a voltage signal. An output terminal of the first switch unit 19, the light-emitting layer 10, and an input terminal of the second switch unit 23 are electrically connected together and are electrically connected to the one of the plurality of multiplexed electrodes 21. An output terminal of the second switch unit 23 is electrically connected to the multiplexed functional line 25. The multiplexed functional line 25 is electrically connected to the light-emitting layer 10 through the third switch unit 24.

Specifically, one of the plurality of light-emitting units 10a includes a first thin film transistor T1, a second thin film transistor T2, a third thin film transistor T3, a storage capacitor Cs, and an OLED light-emitting diode 13.

An input terminal of the second thin film transistor T2 is electrically connected to a data line, to receive a data voltage signal. An output terminal of the second thin film transistor T2, a terminal of the storage capacitor Cs, and a gate of the third thin film transistor T3 are electrically connected together. The other terminal of the storage capacitor Cs and an input terminal of the third thin film transistor T3 are electrically connected together and receive a voltage VDD. An output terminal of the third thin film transistor T3, an input terminal of the first thin film transistor T1, and an output terminal of the third switch unit 24 are electrically connected together. An input terminal of the third switch unit 24 is electrically connected to the multiplexed functional line 25. An output terminal of the first thin film transistor T1 is electrically connected to a terminal of the OLED light-emitting diode 13. The other terminal of the OLED light-emitting diode 13 is electrically connected to the output terminal of the first switch unit 19 and the input terminal of the second switch unit 23, and is electrically connected to the one of the plurality of multiplexed electrodes 21.

In an embodiment, the first thin film transistor T1, the second thin film transistor T2, and the third thin film transistor T3 are p-type field effect transistors.

In an embodiment, the first switch unit 19, the second switch unit 23, and the third switch unit 24 are p-type field effect transistors.

In an embodiment, the OLED display panel further includes a fingerprint recognition chip electrically connected to the plurality of multiplexed functional lines 25.

In an embodiment, the OLED display panel further includes a gray scale current compensation chip electrically connected to the multiplexed functional line 25, to input a gray scale compensation current to the light-emitting layer 10.

Figure 3:
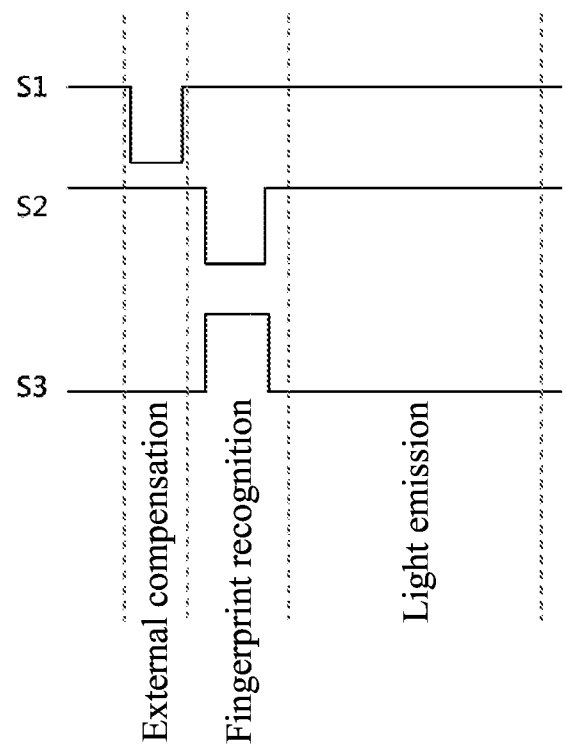
FIG. 3 is a timing diagram of driving an OLED display panel in accordance with an embodiment of the present disclosure.

FIG. 3 is a timing diagram of driving an OLED display panel in accordance with an embodiment of the present disclosure. Specifically, referring to FIG. 3 simultaneously, the OLED display panel is configured such that operations of the OLED display panel includes an external compensation stage, a fingerprint recognition stage, and a light emission stage.

During the external compensation stage, the second switch unit 23 is turned off, the third switch unit 24 is turned on, and a compensation current is input to the light-emitting layer 10 through the multiplexed functional line 25. Specifically, S1 is at a low voltage level, S2 is at a high voltage level, and S3 is at a low voltage level. At this time, T1, T2, T3, and T4 are turned on. T6 is turned off. The data voltage signal is written to the gate of T3. The multiplexed functional line 25 detects a current of T3. When the detected current is larger than a gray scale target current, a voltage value of the data voltage signal is increased to decrease the current of T3; otherwise, a voltage value of the data voltage signal is decreased to increase the current of T3. When the detected current of T3 is same in value as the gray scale target current, external compensation is completed.

During the fingerprint recognition stage, the first switch unit 19 is turned off, the second switch unit 23 is turned on, and the third switch unit 24 is turned off. Specifically, S1 is at a high voltage level, S2 is at a low voltage level, and S3 is at a high voltage level. At this time, T6 is turned on. The other thin film transistors T1, T2, T3, T4, and T5 are turned off. The one of the plurality of multiplexed electrodes 21 and a finger form a capacitor. The multiplexed functional line 25 recognizes a fingerprint by detecting a capacitance change.

During the light emission stage, the first switch unit 19 is turned on, the second switch unit 23 is turned off, and the third switch unit 24 is turned off. Specifically, S1 and S2 are at a high voltage level and S3 is at a low voltage level. At this time, T3, T1, and T5 are turned on. The other thin film transistors T2, T4, and T6 are turned off. T3 controls OLED light emission.

Based on the foregoing, in the present disclosure, the common electrode layer is divided into the first electrode and the plurality of multiplexed electrodes electrically insulated from one another. The first electrode is opposite to the first region, to serve as the common electrode of the first region. Each multiplexed electrode is opposite to the second region, to serve as the fingerprint signal acquisition electrode and the common electrode of the second region. The multiplexed functional line is disposed over the light-emitting layer. The multiplexed functional line is electrically connected to one of the plurality of multiplexed electrodes, to detect a capacitance change caused by the one of the plurality of multiplexed electrodes and a finger, and thereby generate a fingerprint signal. Therefore, fingerprints may be acquired and normal display may be realized in the second region, thereby providing an increased screen ratio effect.

An embodiment of the present disclosure also provides an OLED display device that includes the OLED display panel of any of the aforementioned embodiments.

The OLED display panel provided by each embodiment of the present disclosure is introduced in detail above. Principles and implementation manners of the present disclosure are described herein using specific examples. The description of the foregoing embodiments is only for facilitating understanding of the present disclosure. Meanwhile, to those of ordinary skill in the art, based on the idea of the present disclosure, variations to both specific implementation manners and application scope may be made. In summary, content of the present disclosure should not be considered as limitations to the present disclosure.

What is claimed is:

1. An organic light-emitting diode (OLED) display panel, comprising:
   a light-emitting layer having a first region and a second region;
   a common electrode layer disposed over the light-emitting layer, wherein the common electrode layer comprises a first electrode and a plurality of multiplexed electrodes electrically insulated from one another; the first electrode is opposite to the first region, to serve as a common electrode of the first region; and each multiplexed electrode is opposite to the second region, to serve as a fingerprint signal acquisition electrode and a common electrode of the second region;
   a multiplexed functional line disposed over the light-emitting layer, wherein the multiplexed functional line is electrically connected to one of the plurality of multiplexed electrodes, to detect a capacitance change caused by the one of the plurality of multiplexed electrodes and a finger, and thereby generate a fingerprint signal; the multiplexed functional line is electrically connected to the light-emitting layer and an external compensating circuit, to compensate a gray scale current of the light-emitting layer; and
   a fingerprint recognition chip electrically connected to the multiplexed functional line.

2. The OLED display panel of claim 1, further comprising: a first switch unit, a second switch unit, and a third switch unit, wherein an input terminal of the first switch unit receives a voltage signal; an output terminal of the first switch unit, the light-emitting layer, and an input terminal of the second switch unit are electrically connected together and are electrically connected to the one of the plurality of multiplexed electrodes; an output terminal of the second switch unit is electrically connected to the multiplexed functional line; and the multiplexed functional line is electrically connected to the light-emitting layer through the third switch unit.

3. The OLED display panel of claim 2, wherein the OLED display panel is configured such that operations of the OLED display panel comprise:
   an external compensation stage during which the second switch unit is turned off, the third switch unit is turned on, and a compensation current is input to the light-emitting layer through the multiplexed functional line;
   a fingerprint recognition stage during which the first switch unit is turned off, the second switch unit is turned on, and the third switch unit is turned off; and
   a light emission stage during which the first switch unit is turned on, the second switch unit is turned off, and the third switch unit is turned off.

4. The OLED display panel of claim 3, wherein the light-emitting layer comprises a plurality of light-emitting units; one of the plurality of light-emitting units comprises: a first thin film transistor, a second thin film transistor, a third thin film transistor, a storage capacitor, and an OLED light-emitting diode; an input terminal of the second thin film transistor is electrically connected to a data line; an output terminal of the second thin film transistor, a terminal of the storage capacitor, and a gate of the third thin film transistor are electrically connected together; the other terminal of the storage capacitor and an input terminal of the third thin film transistor are electrically connected together and receive a voltage VDD; an output terminal of the third thin film transistor, an input terminal of the first thin film transistor, and an output terminal of the third switch unit are electrically connected together; an input terminal of the third switch unit is electrically connected to the multiplexed functional line; an output terminal of the first thin film transistor is electrically connected to a terminal of the OLED light-emitting diode; the other terminal of the OLED light-emitting diode, the output terminal of the first switch unit, and the input terminal of the second switch unit are electrically connected together, and are electrically connected to the one of the plurality of multiplexed electrodes.

5. The OLED display panel of claim 4, wherein the first thin film transistor, the second thin film transistor, and the third thin film transistor are p-type field effect transistors.

6. The OLED display panel of claim 4, wherein the first switch unit, the second switch unit, and the third switch unit are p-type field effect transistors.

7. The OLED display panel of claim 1, further comprising: a gray scale current compensation chip electrically connected to the multiplexed functional line.

8. An organic light-emitting diode (OLED) display panel, comprising:
   a light-emitting layer having a first region and a second region;
   a common electrode layer disposed over the light-emitting layer, wherein the common electrode layer comprises a first electrode and a plurality of multiplexed electrodes electrically insulated from one another; the first electrode is opposite to the first region, to serve as a common electrode of the first region; and each multiplexed electrode is opposite to the second region, to serve as a fingerprint signal acquisition electrode and a common electrode of the second region; and
   a multiplexed functional line disposed over the light-emitting layer, wherein the multiplexed functional line is electrically connected to one of the plurality of multiplexed electrodes, to detect a capacitance change caused by the one of the plurality of multiplexed electrodes and a finger, and thereby generate a fingerprint signal.

9. The OLED display panel of claim 8, wherein the multiplexed functional line is electrically connected to the light-emitting layer and an external compensating circuit, to compensate a gray scale current of the light-emitting layer.

10. The OLED display panel of claim 9, further comprising: a first switch unit, a second switch unit, and a third switch unit, wherein an input terminal of the first switch unit receives a voltage signal; an output terminal of the first switch unit, the light-emitting layer, and an input terminal of the second switch unit are electrically connected together and are electrically connected to the one of the plurality of multiplexed electrodes; an output terminal of the second switch unit is electrically connected to the multiplexed functional line; and the multiplexed functional line is electrically connected to the light-emitting layer through the third switch unit.

11. The OLED display panel of claim 10, wherein the OLED display panel is configured such that operations of the OLED display panel comprise:
   an external compensation stage during which the second switch unit is turned off, the third switch unit is turned on, and a compensation current is input to the light-emitting layer through the multiplexed functional line;
   a fingerprint recognition stage during which the first switch unit is turned off, the second switch unit is turned on, and the third switch unit is turned off; and
   a light emission stage during which the first switch unit is turned on, the second switch unit is turned off, and the third switch unit is turned off.

12. The OLED display panel of claim 11, wherein the light-emitting layer comprises a plurality of light-emitting units; one of the plurality of light-emitting units comprises: a first thin film transistor, a second thin film transistor, a third thin film transistor, a storage capacitor, and an OLED light-emitting diode; an input terminal of the second thin film transistor is electrically connected to a data line; an output terminal of the second thin film transistor, a terminal of the storage capacitor, and a gate of the third thin film transistor are electrically connected together; the other terminal of the storage capacitor and an input terminal of the third thin film transistor are electrically connected together and receive a voltage VDD; an output terminal of the third thin film transistor, an input terminal of the first thin film transistor, and an output terminal of the third switch unit are electrically connected together; an input terminal of the third switch unit is electrically connected to the multiplexed functional line; an output terminal of the first thin film transistor is electrically connected to a terminal of the OLED light-emitting diode; the other terminal of the OLED light-emitting diode, the output terminal of the first switch unit, and the input terminal of the second switch unit are electrically connected together, and are electrically connected to the one of the plurality of multiplexed electrodes.

13. The OLED display panel of claim 12, wherein the first thin film transistor, the second thin film transistor, and the third thin film transistor are p-type field effect transistors.

14. The OLED display panel of claim 12, wherein the first switch unit, the second switch unit, and the third switch unit are p-type field effect transistors.

15. The OLED display panel of claim 8, further comprising: a fingerprint recognition chip electrically connected to the multiplexed functional line.

16. The OLED display panel of claim 8, further comprising: a gray scale current compensation chip electrically connected to the plurality of multiplexed functional lines.

17. An organic light-emitting diode (OLED) display device comprising an OLED display panel, wherein the OLED display panel comprises:
a light-emitting layer having a first region and a second region;
a common electrode layer disposed over the light-emitting layer, wherein the common electrode layer comprises a first electrode and a plurality of multiplexed electrodes electrically insulated from one another; the first electrode is opposite to the first region, to serve as a common electrode of the first region; and each multiplexed electrode is opposite to the second region, to serve as a fingerprint signal acquisition electrode and a common electrode of the second region; and
a multiplexed functional line disposed over the light-emitting layer, wherein the multiplexed functional line is electrically connected to one of the plurality of multiplexed electrodes, to detect a capacitance change caused by the one of the plurality of multiplexed electrodes and a finger, and thereby generate a fingerprint signal.

18. The OLED display device of claim 17, wherein the multiplexed functional line is electrically connected to the light-emitting layer and an external compensating circuit, to compensate a gray scale current of the light-emitting layer.

19. The OLED display device of claim 18, further comprising: a first switch unit, a second switch unit, and a third switch unit, wherein an input terminal of the first switch unit receives a voltage signal; an output terminal of the first switch unit, the light-emitting layer, and an input terminal of the second switch unit are electrically connected together and are electrically connected to one of the plurality of multiplexed electrodes; an output terminal of the second switch unit is electrically connected to the multiplexed functional line; and the multiplexed functional line is electrically connected to the light-emitting layer through the third switch unit.

20. The OLED display device of claim 19, wherein the OLED display panel is configured such that operations of the OLED display panel comprise:
an external compensation stage during which the second switch unit is turned off, the third switch unit is turned on, and a compensation current is input to the light-emitting layer through the multiplexed functional line;
a fingerprint recognition stage during which the first switch unit is turned off, the second switch unit is turned on, and the third switch unit is turned off; and
a light emission stage during which the first switch unit is turned on, the second switch unit is turned off, and the third switch unit is turned off.

* * * * *